(12) United States Patent
Yamasaki

(10) Patent No.: US 8,386,730 B2
(45) Date of Patent: Feb. 26, 2013

(54) DATA LOGGER, DATA SAVING METHOD AND PROGRAM

(75) Inventor: Kentaro Yamasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 397 days.

(21) Appl. No.: 12/673,792

(22) PCT Filed: Aug. 22, 2008

(86) PCT No.: PCT/JP2008/064979
§ 371 (c)(1),
(2), (4) Date: Feb. 17, 2010

(87) PCT Pub. No.: WO2009/034821
PCT Pub. Date: Mar. 19, 2009

(65) Prior Publication Data
US 2011/0055502 A1    Mar. 3, 2011

(30) Foreign Application Priority Data
Sep. 11, 2007  (JP) .................. 2007-235365

(51) Int. Cl.
G06F 12/00  (2006.01)

(52) U.S. Cl. ........ 711/162; 701/33.4; 702/187; 711/159

(58) Field of Classification Search .................. None
See application file for complete search history.

(56) References Cited

U.S. PATENT DOCUMENTS

| | | | | |
|---|---|---|---|---|
| 5,412,570 A * | 5/1995 | Gruler et al. | ................. | 701/33.4 |
| 5,848,365 A * | 12/1998 | Coverdill | ..................... | 701/33.4 |
| 7,117,079 B2 * | 10/2006 | Streichsbier et al. | ......... | 701/114 |
| 2001/0032061 A1 * | 10/2001 | Cheale et al. | ................. | 702/187 |
| 2004/0066944 A1 * | 4/2004 | Leenen et al. | ................ | 381/314 |
| 2004/0233697 A1 * | 11/2004 | Yamashita et al. | ............ | 365/145 |
| 2005/0288903 A1 * | 12/2005 | Jackson et al. | ................ | 702/187 |
| 2007/0255150 A1 * | 11/2007 | Brodnick | ...................... | 600/509 |
| 2008/0051988 A1 * | 2/2008 | Segawa | ......................... | 701/207 |
| 2008/0143538 A1 * | 6/2008 | Young et al. | ............... | 340/573.1 |
| 2008/0194916 A1 * | 8/2008 | Limma et al. | ................. | 600/300 |
| 2008/0250196 A1 * | 10/2008 | Mori | ............................ | 711/105 |

FOREIGN PATENT DOCUMENTS

| JP | 4-172294 A | 6/1992 |
|---|---|---|
| JP | 6-18293 A | 1/1994 |
| JP | 6-36050 A | 2/1994 |
| JP | 9-56685 A | 3/1997 |

(Continued)

OTHER PUBLICATIONS

International Search Report for PCT/JP2008/064979 mailed Nov. 25, 2008.

Primary Examiner — Kaushikkumar Patel

(57) ABSTRACT

It is an object to provide a data logger which solves a problem in which data required to analyze a cause of occurrence of abnormality cannot be acquired. Temporary memory 102 stores newer data among data sequentially outputted from measurer 101 wherein the number of the newer data corresponds to a specific number of times. Manager 103 repeatedly calculates an index value indicative of stability of the data outputted from measurer 101 based on the data stored in temporary memory 102 at least until the index value satisfies a predetermined stability condition. Further, if manager 103 accepts an abnormal value trigger, manager 103 sequentially stores the data outputted from measurer 101 in main memory 104. When the index value satisfying the stability condition is calculated by manager 103, manager 103 stops saving the data in main memory 104.

12 Claims, 12 Drawing Sheets

FOREIGN PATENT DOCUMENTS

| | | |
|---|---|---|
| JP | 10-143543 A | 5/1998 |
| JP | 11-296556 A | 10/1999 |
| JP | 11-304543 A | 11/1999 |
| JP | 2002202158 A | 7/2002 |
| JP | 2005259041 A | 9/2005 |
| JP | 3797707 B | 4/2006 |
| JP | 2007085780 A | 4/2007 |
| JP | 2007170847 A | 7/2007 |

\* cited by examiner

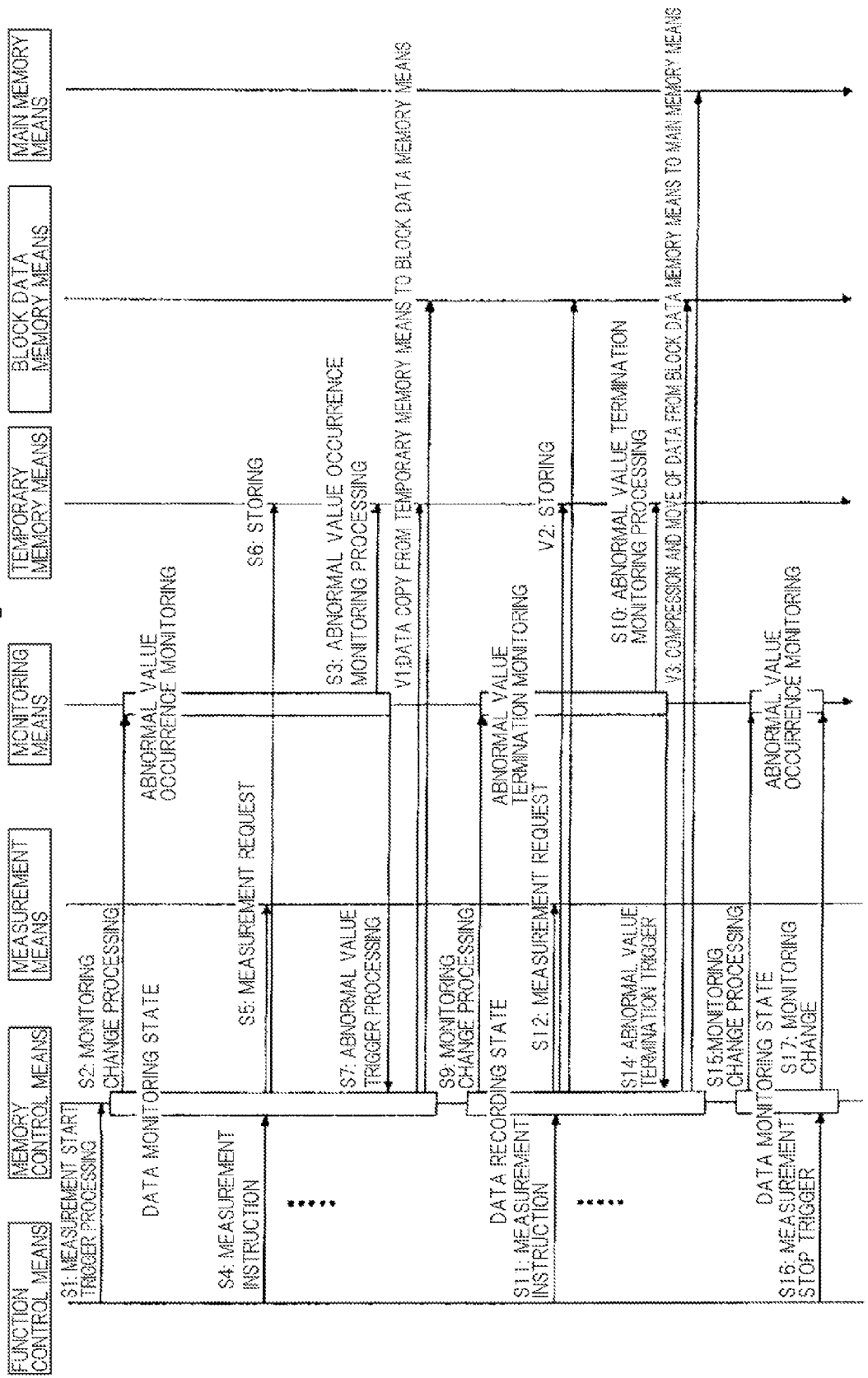

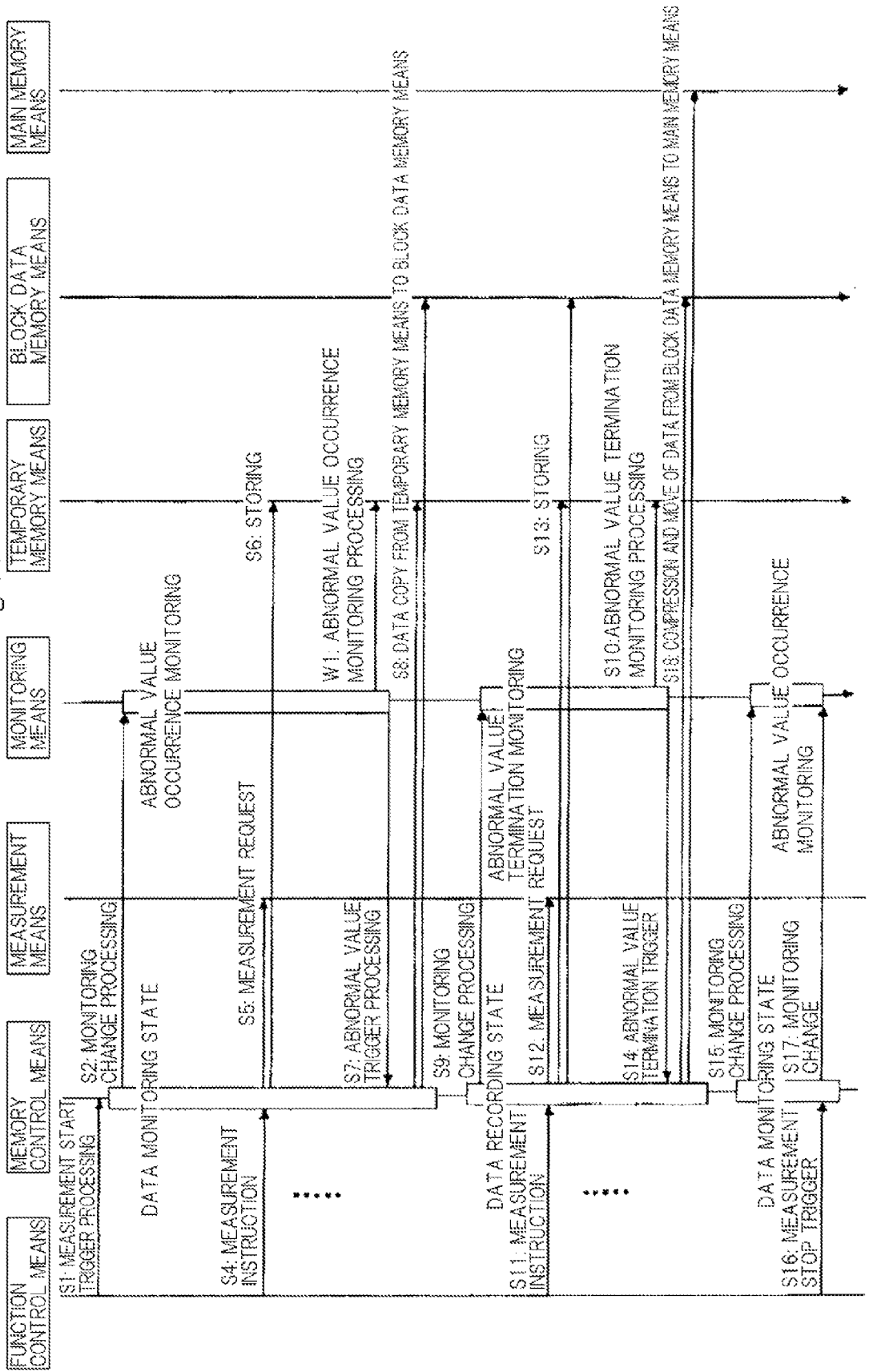

DATA LOGGER, DATA SAVING METHOD AND PROGRAM

This application is the National Phase of PCT/JP2008/064979, filed Aug. 22, 2008, which claims priority based on Japanese Patent application Laid-Open No. 2007-235365 filed on Sep. 11, 2007, which disclosure is incorporated herein in its entirety.

TECHNICAL FIELD

The present invention relates to a data logger, a data saving method and a program for saving specific data.

BACKGROUND ART

A data logger is used for environmental measurement, product quality control, and the like. The data logger is measurement equipment for measuring data of a monitoring target by using a sensor or the like and saving the data. The data logger includes, for example, an RFID (Radio Frequency Identification) tag.

Examples of using a data logger include checking whether or not fresh food or frozen food is transported at a predetermined controlled temperature using a data logger which measures temperature (a temperature logger), and checking whether or not a shock is applied to a precision device during its transportation using a data logger which measures strength of shock (a shock logger).

Generally, a data logger measures data of a monitored target at as short a measurement time interval as possible in order to know a detailed state of the monitored target.

However, as the measurement time interval becomes shorter, the amount of stored data increases, thereby requiring a large-capacity storage. Hence, a logger device without a large-capacity storage, such as an RFID tag, has a problem in that its data cannot be measured at a short time interval.

Further, a data logger with a relatively large capacity also has a problem in that when stored data is transferred to a processing device such as a PC to be analyzed or viewed, the transfer time of the data is increased because the amount of the data is increased.

To solve these problems, a method of storing only abnormal data among data has been used. However, this method has a problem in that just abnormal data may be insufficient to analyze the reasons why abnormality occurs.

In patent document 1 (Japanese Patent Laid-Open No. 9-56685), an electrocardiograph which can also store normal data before and after abnormal data has been described. This electrocardiograph includes first storage means, second storage means, and control means, and operates as follows.

The first storage means stores a detected electrocardiogram waveform (corresponding to data). Then, the first storage means overwrites an electrocardiogram waveform at certain time intervals. If a detected heartbeat is different from that in normal times, the second storage means stores its electrocardiogram waveform over a certain period of time instead of the first storage means. When the second storage means finishes storing the electrocardiogram waveform, the control means transfers the electrocardiogram waveform stored in the first storage means to the second storage means as an electrocardiogram waveform before the occurrence of the abnormality,.

Therefore, the electrocardiogram waveforms before and after the occurrence of the abnormality can be stored. In addition, since the first storage means overwrites an electrocardiogram waveform at certain time intervals, the amount of stored data can be prevented from increasing.

Patent Document 1: Japanese Patent Laid-Open No. 9-56685

DISCLOSURE OF THE INVENTION

Problems to be Solved by the Invention

If transition of data is made within normal values after the occurrence of abnormality, a transition pattern of data or the like until the data is stabilized may be important for analyzing the cause of the occurrence of the abnormality. The transition pattern is, for example, a time until data is stabilized or a value of stabilized data.

In the electrocardiograph described in patent document 1, an electrocardiogram waveform is stored over a certain time after occurrence of abnormality. However, if data is not stabilized even after the elapse of a certain time, there occurs a problem in which data required for analyzing the cause of the occurrence of abnormality cannot be acquired.

An object of the present invention is to provide a data logger, a data saving method and a program which solve a problem that data required to analyze a cause of occurrence of abnormality cannot be acquired, which is the above described problem.

Means for Solving the Problems

A data logger according to the present invention includes: first storage means for storing newer data among data sequentially outputted from measurement means wherein the number of the newer data corresponds to a specific number of times; second storage means; and management means for, if a save instruction to save the data outputted from the measurement means is accepted, repeatedly calculating an index value indicative of stability of the data outputted from the measurement means based on the data stored in the first storage means at least until the index value satisfies a predetermined stability condition, and sequentially saving the data outputted from the measurement means in the second storage means, and when the index value satisfying the stability condition is calculated, stopping saving the data from the measurement means in the second storage means.

A data saving method according to the present invention is a data saving method performed by a data logger which includes first storage means for storing newer data among data sequentially outputted from measurement means wherein the number of the newer data corresponds to a specific number of times, and second storage means, the method comprising: if a save instruction to save the data outputted from the measurement means is accepted, repeatedly calculating an index value indicative of stability of the data outputted from the measurement means based on the data stored in the first storage means at least until the index value satisfies a predetermined stability condition; sequentially saving the data outputted from the measurement means in the second storage means if the save instruction is accepted; and stopping saving the data from the measurement means in the second storage means when the index value satisfying the stability condition is calculated.

A program according to the present invention is a program causing a computer to execute data saving processing, the computer being connected to first storage means for storing newer data among data sequentially outputted from measurement means wherein the number of the newer data corresponds to a specific number of times, and second storage means, the data saving processing comprising: calculating processing for, if a save instruction to save the data outputted from the measurement means is accepted, repeatedly calculating an index value indicative of stability of the data outputted from the measurement means based on the data stored in the first storage means at least until the index value satisfies a predetermined stability condition; saving processing for sequentially saving the data outputted from the measurement means in the second storage means if the save instruction is accepted; and stop processing for stopping saving the data from the measurement means in the second storage means when the index value satisfying the stability condition is calculated.

ADVANTAGE OF THE INVENTION

According to the present invention, data required for analyzing a cause of occurrence of abnormality can be acquired.

BRIEF DESCRIPTION OF THE DRAWINGS

FIG. 12 is a flowchart for illustrating an operation of the data logger of the fifth exemplary embodiment; and FIG. 13 is a flowchart for illustrating an operation of a data logger of a sixth exemplary embodiment.

EXEMPLARY EMBODIMENTS

Hereinafter, exemplary embodiments will be described with reference to the drawings.

Figure 1:
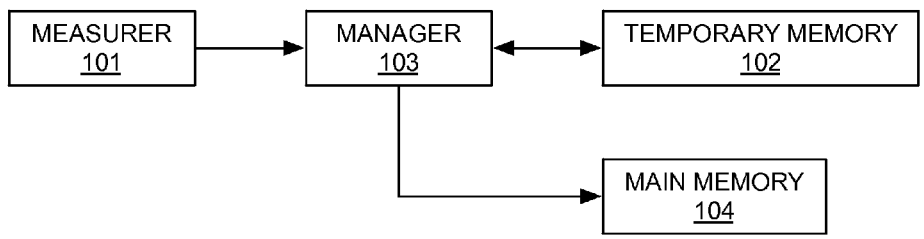
FIG. 1 is a block diagram showing a configuration of a data logger of a first exemplary embodiment.

FIG. 1 is a block diagram showing a configuration of a data logger of a first exemplary embodiment. In FIG. 1, the data logger includes measurer 101, temporary memory 102, manager 103, and main memory 104. Although measurer 101 is included in the data logger in the present exemplary embodiment, it may be separated from the data logger in practice.

Measurer 101 periodically measures specific data, and sequentially outputs the data. The specific data are, for example, temperature, humidity, shock, illumination, slope, and vibration.

For example, measurer 101 includes a sensor and a converter. The sensor sequentially measures the specific data, and outputs the data as an analog signal. The converter converts the analog signal outputted from the sensor to a digital signal and outputs it.

Temporary memory 102 is one example of the first storage means. Temporary memory 102 stores newer data among data sequentially outputted from measurer 101 such that the number of stored data become a specific number. For example, temporary memory 102 is a FIFO (First-In First-Out) type storage device. In this case temporary memory 102 stores each time the specific number of new data items and deleted the previously data item.

Manager 103 accepts an abnormal value trigger. The abnormal value trigger used herein is one example of save instruction to save data outputted by measurer 101.

If manager 103 accepts the abnormal value trigger, manager 103 sequentially stores the data outputted from measurer 101 in main memory 104. Main memory 104 is one example of the second storage means.

In addition, if manager 103 accepts the abnormal value trigger, manager 103 repeatedly calculates an index value indicative of stability of the data outputted from measurer 101 based on the data stored in temporary memory 102 at least until the index value satisfies a predetermined stability condition.

For example, manager 103 performs the following processing each time data is stored in temporary memory 102 or at certain time intervals.

First, manager 103 identifies target data which is a target of determination, from the data stored in temporary memory 102.

The target data may be all or some of the data stored in temporary memory 102. If the target data is some of the data stored in temporary memory 102, manager 103 identifies, for example, newer data the number of which corresponds to a predetermined number smaller than a specific number, as the target data. Desirably, the number of the target data is more than one. A plurality of target data are assumed in the following description.

Then, manager 103 obtains slopes of the plurality of target data $A_{1,2}$ to $A_{n-1,n}$, and determines a maximum slope $A_{x,y}$ among the slopes $A_{1,2}$ to $A_{n-1,n}$, as index value I. Alternatively, manager 103 may obtain an average value $A_{ave}$ of the slopes $A_{1,2}$ to $A_{n-1,n}$, as index value I.

Then, manager 103 determines whether or not index value I is greater than predetermined reference value Th. If index value I is greater than reference value Th, manager 103 determines that index value I satisfies a stability condition.

Alternatively, manager 103 may obtain variance V of the plurality of target data as index value I, and determine whether or not index value I is greater than reference value Th. In this case, if index value I is greater than reference value Th, manager 103 determines that index value I satisfies a stability condition.

Manager 103 may perform a plurality of these determinations. In this case, manager 103 may determine that index value I satisfies the stability condition if it determines that index value I is greater than reference value Th in one of the plurality of determinations, or may determine that index value I satisfies the stability condition if it determines that index value I is greater than reference value Th in every one of the plurality of determinations.

The reference value is defined by a user or the like. In a case where manager 103 performs a plurality of determinations, a plurality of reference values corresponding respectively to the plurality of determinations are defined.

In addition, it is desirable that when an index value satisfies the stability condition, manager 103 stops the calculation of index values. In this case, calculation of unnecessary index values can be prevented.

When an index value satisfies the stability condition, that is, when the index value satisfying the stability condition is calculated, manager 103 stops saving data in main memory 104.

Therefore, if an abnormal value trigger is outputted when, for example, data becomes an abnormal value, main memory 104 will save data from when it becomes an abnormal value until when it is stabilized. Accordingly, main memory 104 can save only data required for analyzing a cause of occurrence of abnormality among the data.

Operation will be described below.

Figure 2:
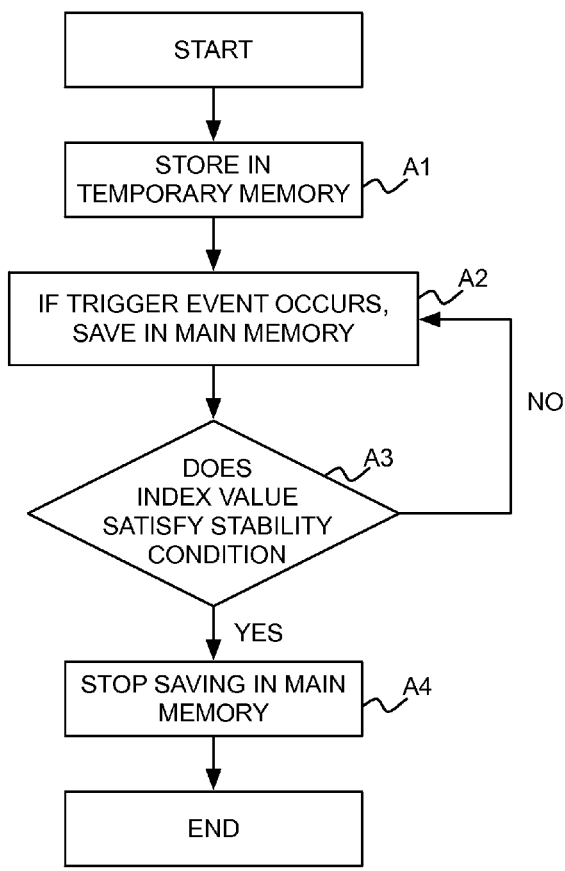
FIG. 2 is a flowchart for illustrating an operation of the data logger of the first exemplary embodiment.

FIG. 2 is a flowchart for illustrating the operation of the data logger. Measurer 101 measures specific data, and sequentially outputs the data to manager 103.

In step A1, if manager 103 accepts the data, manager 103 sequentially stores the data in temporary memory 102. Then, if the capacity of temporary memory 102 is insufficient, manager 103 erases the oldest data in temporary memory 102, and stores the accepted data in temporary memory 102. The capacity of temporary memory 102 is assumed to be a capacity which can store, among the data, data the number of which corresponds to a specific number.

In addition, if manager 103 accepts an abnormal value trigger, manager 103 executes step A2.

In step A2, manager 103 sequentially stores the data accepted from measurer 101 in temporary memory 102, as well as sequentially saving the data in main memory 104.

Manager 103 executes step A3 each time data is stored a certain number of times in temporary memory 102. Manager 103 may execute step A3 at certain time intervals.

In step A3, manager 103 calculates an index value based on the data stored in temporary memory 102, and determines whether or not the index value satisfies a stability condition. Manager 103 executes step A4 if the index value satisfies the stability condition, and executes step A2 if the index value does not satisfy the stability condition.

In step A4, manager 103 stops saving the data accepted from measurer 101 in main memory 104.

Next, advantages will be described.

According to the present exemplary embodiment, temporary memory 102 stores newer data among data sequentially outputted from measurer 101 wherein the number of the newer data corresponds to a specific number of times. Manager 103 repeatedly calculates an index value indicative of stability of the data outputted from measurer 101 based on the data stored in temporary memory 102 at least until the index value satisfies a predetermined stability condition. In addition, if manager 103 accepts an abnormal value trigger, manager 103 sequentially stores the data outputted from measurer 101 in main memory 104. Then, when the index value satisfying the stability condition is calculated, manager 103 stops saving the data in main memory 104.

Therefore, the outputted data is saved if the abnormal value trigger is accepted. In addition, saving of the data is stopped when the index value satisfying the stability condition is calculated.

Thus, if a stability condition is set as appropriate, data can be saved until it is stabilized. Therefore, data required for analyzing a cause of occurrence of abnormality can be acquired.

Next, a second exemplary embodiment will be described. Components and functions different from those of the data logger described in the first exemplary embodiment will be mainly described below.

Figure 3:
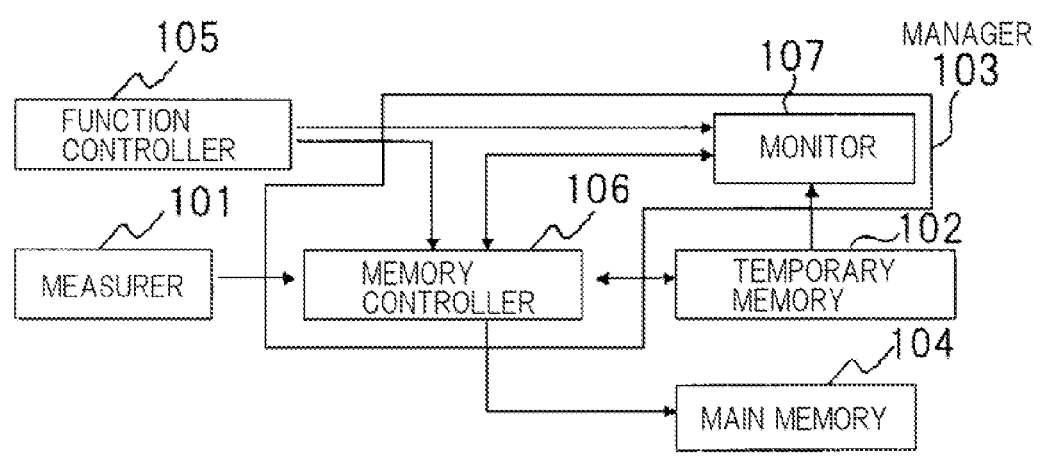
FIG. 3 is a block diagram showing a configuration of a data logger of a second exemplary embodiment.

FIG. 3 is a block diagram showing a configuration of a data logger of the present exemplary embodiment. In FIG. 3, the same elements as in FIG. 1 are given the same symbols.

In FIG. 3, the data logger further includes function controller 105 in addition to the components shown in FIG. 1. Further, manager 103 includes memory controller 106 and monitor 107.

Function controller 105 controls the whole data logger.

For example, function controller 105 controls start and stop of data measurement performed by measurer 101. Specifically, at the start of the measurement, function controller 105 outputs a measurement start trigger to memory controller 106 to start the data measurement by measurer 101. Further, at the end of the measurement, function controller 105 outputs a measurement stop trigger to memory controller 106 to stop the data measurement by measurer 101.

In addition, function controller 105 performs setting about data measurement. Specifically, function controller 105 includes a timer for measuring a measurement time of data and a power source used for measurement and driving the timer, and measures data by outputting a measurement instruction to measure data to memory controller 106 for each measurement time measured by the timer.

Further, function controller 105 outputs data saved in main memory 104 to an external device such as a PC. Further, function controller 105 outputs the data when it accepts a request from the external device or a signal from a switch attached to the data logger.

Memory controller 106 holds state information indicative of a state of the data logger. The state information includes non-measurement state information, data monitoring state information, and data recording state information. Memory controller 106 holds one of these state information.

If memory controller 106 has held the non-measurement state information, the data is not stored. If memory controller 106 has held the data monitoring state information, memory controller 106 stores the data in temporary memory 102. If memory controller 106 has held the data recording state information, memory controller 106 stores the data in temporary memory 102 and saves the data in main memory 104.

This state information is changed by a trigger from function controller 105 and monitor 107.

Specifically, if function controller 105 accepts a measurement start trigger from function controller 105 when it has held the non-measurement state information, function controller 105 changes the state information to the data monitoring state information. If function controller 105 accepts an abnormal value trigger from monitor 107 when it has held the data monitoring state information, function controller 105 changes the state information to the data recording state information. If function controller 105 accepts an abnormal value termination trigger from monitor 107 when it has held the data recording state information, function controller 105 changes the state information to the data monitoring state information. If function controller 105 accepts a measurement end trigger from function controller 105 when it has held the data monitoring state information or the data recording state information, function controller 105 changes the state information to the non-measurement state information.

When memory controller 106 changes the data monitoring state information to the data recording state information as described above, memory controller 106 copies the data stored in temporary memory 102 to main memory 104 so that data is saved before the occurrence of abnormality. This is intended to address a case where data before the occurrence of abnormality is required for analyzing the cause of the occurrence of abnormality.

Monitor 107 monitors the data stored in temporary memory 102. This monitoring processing by monitor 107 for monitoring the data stored in temporary memory 102 includes abnormal value occurrence monitoring processing and abnormal value termination monitoring processing.

Whether monitor 107 performs the abnormal value occurrence monitoring processing or the abnormal value termination monitoring processing is determined depending on state information of memory controller 106. Specifically, monitor 107 performs the abnormal value occurrence monitoring processing when memory controller 106 holds the data monitoring state information, and performs the abnormal value termination monitoring processing when memory controller 106 holds the data recording state information. When memory controller 106 holds the non-measurement state information, monitor 107 does not monitor the data.

In the abnormal value occurrence monitoring processing, monitor 107 repeatedly determines whether or not data newly stored in temporary memory 102 is in a predetermined threshold range. The threshold range is, for example, a range greater than or equal to a predetermined threshold value, a range greater than the predetermined threshold value, a range less than or equal to the predetermined threshold value, a range less than the predetermined threshold value, or the like. Such a threshold range and a threshold value are defined by a user or the like.

Monitor 107 outputs an abnormal value trigger to memory controller 106 if the data is outside the threshold range.

On the other hand, in abnormal value termination monitoring processing, monitor 107 repeatedly calculates an index value until the index value satisfies a stability condition. In addition, monitor 107 determines whether or not data newly stored in temporary memory 102 is in the predetermined threshold range.

If the data is in the predetermined threshold range and the index value satisfies the stability condition, monitor 107 outputs an abnormal value termination trigger to memory controller 106.

As described above, when accepting the abnormal value trigger, memory controller 106 changes the held state information to the data recording state information. Further, if memory controller 106 holds the data recording state information, monitor 107 performs abnormal value termination monitoring processing. Thus, when memory controller 106 accepts the abnormal value trigger, monitor 107 repeatedly calculates an index value until the index value satisfies the stability condition.

Further, when monitor 107 calculates the index value satisfying the stability condition, monitor 107 outputs an abnormal value termination trigger. When memory controller 106 accepts the abnormal value termination trigger, memory controller 106 changes the held data recording state information to the data monitoring state information. After it is changed to the data monitoring state information, memory controller 106 does not save the data in main memory 104. Thus, when monitor 107 calculates the index value satisfying the stability condition, memory controller 106 stops saving of the data in main memory 104.

Figure 4:
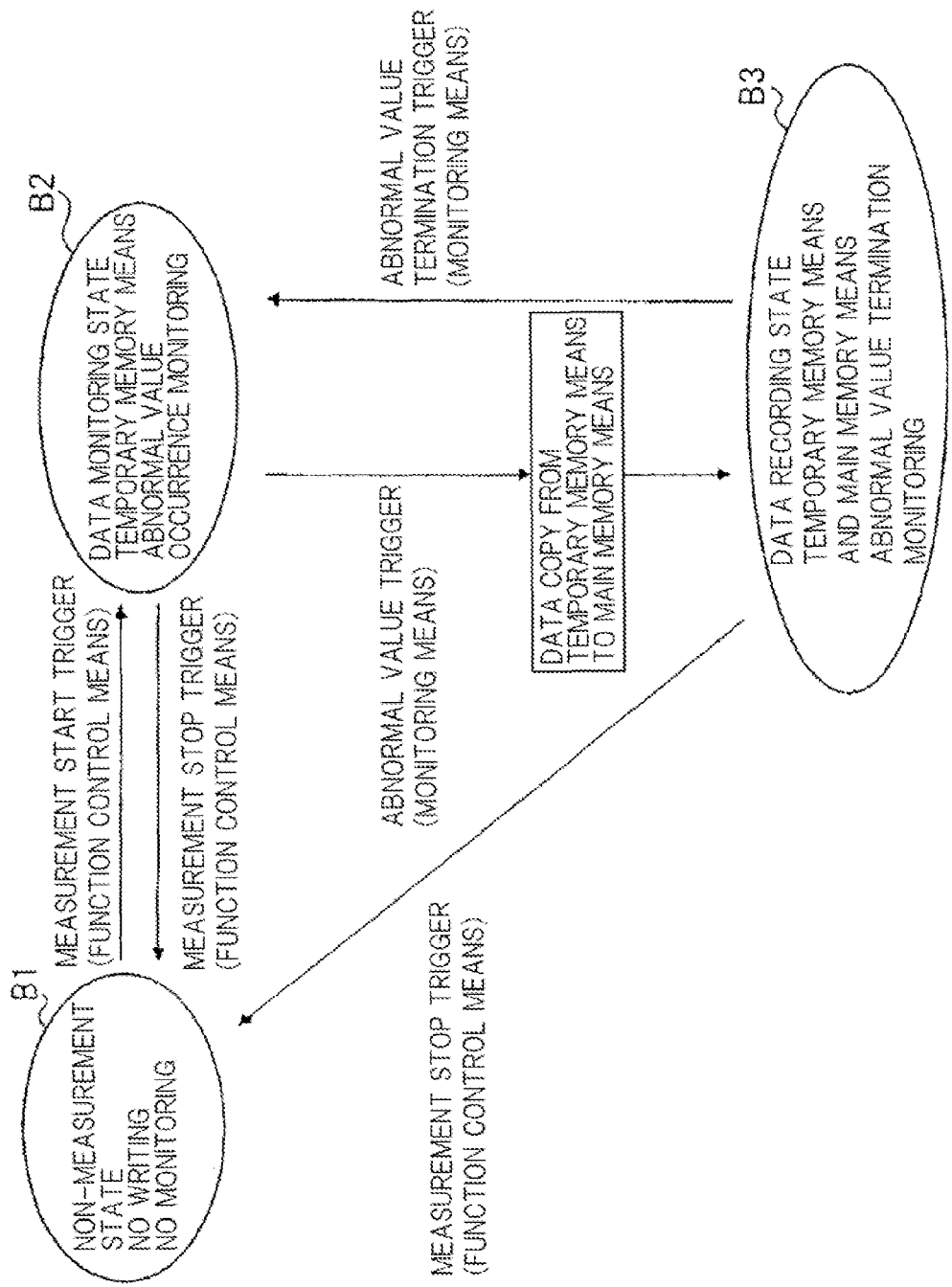
FIG. 4 is an explanatory diagram for illustrating state transition of the data logger of the second exemplary embodiment.

Next, an overview of state transition of the data logger will be described. FIG. 4 is an explanatory diagram for illustrating state transition of the data logger.

First, in non-measurement state B1, memory controller 106 holds the non-measurement state information. At this time, data measured by measurer 101 is not stored, and monitor 107 does not monitor the data.

In non-measurement state B1, when accepting a measurement start trigger from function controller 105, memory controller 106 changes the non-measurement state information to the data monitoring state information, thereby changing the state of the data logger to data monitoring state B2.

In data monitoring state B2, temporary memory 102 sequentially stores data, and monitor 107 performs abnormal value occurrence monitoring processing.

In data monitoring state B2, when accepting an abnormal value trigger from monitor 107, memory controller 106 changes the data monitoring state information to the data recording state information, thereby changing the state of the data logger to data recording state B3. At this time, memory controller 106 copies the data stored in temporary memory 102 to main memory 104.

In data recording state B3, temporary memory 102 sequentially stores data, and main memory 104 sequentially saves data. Further, monitor 107 performs abnormal value termination monitoring processing.

In data recording state B3, when accepting an abnormal value termination trigger from monitor 107, memory controller 106 changes the data recording state information to the data monitoring state information, thereby changing the state of the data logger to data monitoring state B2.

In data monitoring state B2 and in data recording state B3, when accepting a measurement end trigger from function controller 105, memory controller 106 changes the state information to the non-measurement state information, thereby changing the state of the data logger to non-measurement state B1.

Next, operation of the data logger will be described.

Figure 5:
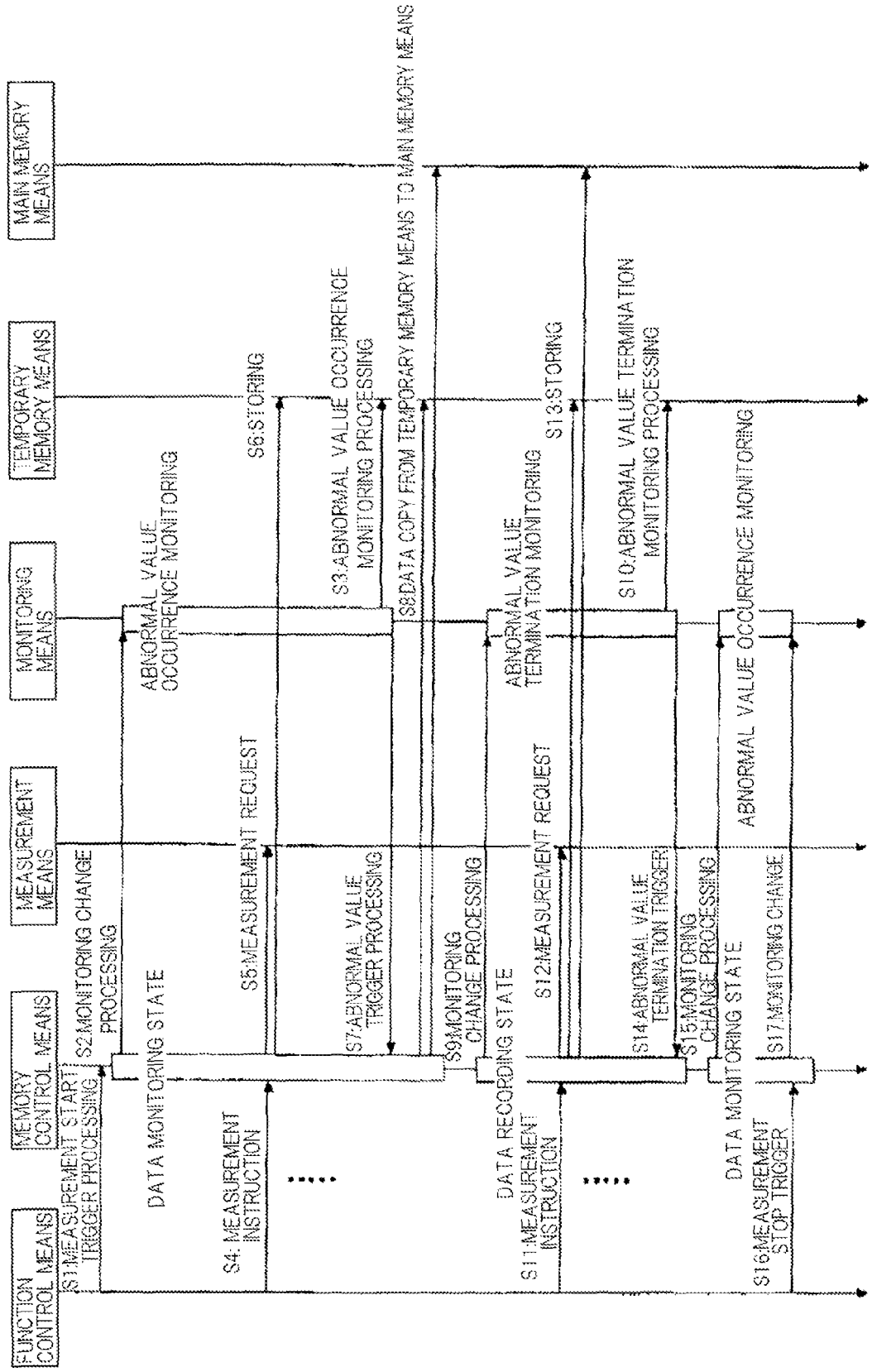
FIG. 5 is a sequence diagram for illustrating an operation of the data logger of the second exemplary embodiment.

FIG. 5 is a sequence diagram for illustrating the operation of the data logger of the present exemplary embodiment. Memory controller 106 holds the non-measurement state information.

In step S1, when function controller 105 accepts a measurement start request for starting measurement from an operating portion for user operation (not shown), function controller 105 outputs a measurement start trigger to memory controller 106. Upon accepting the measurement start trigger, memory controller 106 executes step S2. The operating portion is, for example, a switch or a button for starting measurement.

Further, after outputting the measurement start trigger to memory controller 106, function controller 105 executes step S4.

In step S2, memory controller 106 changes the held state information from the non-measurement state information to the data monitoring state information, as well as output an abnormal value occurrence monitoring signal to monitor 107. Upon accepting the abnormal value occurrence monitoring signal, monitor 107 executes step S3.

In step S3, monitor 107 accesses the newest data in temporary memory 102, and determines whether or not the data is in a threshold range. This processing is repeated each time data is stored in temporary memory 102 a certain number of times, or at certain time intervals.

If monitor 107 determines that the data is outside the threshold range, monitor 107 outputs an abnormal value trigger to memory controller 106. After that, step S7 is executed.

In step S4, the timer of function controller 105 outputs a measurement instruction to measure data to memory controller 106 for each preset measurement time. Upon accepting this measurement instruction, memory controller 106 executes step S5.

In step S5, memory controller 106 outputs a measurement request for measuring data to measurer 101. Upon accepting this measurement request, the converter of measurer 101 accepts data which is an analog signal outputted from the sensor of measurer 101. The converter converts the analog signal to a digital signal, and outputs data of the digital signal to memory controller 106. Upon accepting the data, memory controller 106 executes step S6.

In step S6, memory controller 106 stores the data in temporary memory 102. At this time, if the capacity of temporary memory 102 is insufficient, memory controller 106 erases the oldest data in temporary memory 102, and stores the accepted data in temporary memory 102.

Then, in step S7, memory controller 106 accepts the abnormal value trigger outputted from monitor 107 in step S3. Upon accepting the abnormal value trigger, memory controller 106 executes step S8.

In step S8, memory controller 106 copies the data stored in temporary memory 102 to main memory 104. After completing step S8, memory controller 106 executes step S9.

In step S9, memory controller 106 changes the held state information from data monitoring state information to data recording state information, as well as outputs to monitor 107 an abnormal value termination monitoring signal instructing to perform abnormal value termination monitoring processing. Upon accepting the abnormal value termination monitoring signal, monitor 107 executes step S10.

In step S10, monitor 107 accesses the data in temporary memory 102, and determines whether or not the data newly stored in temporary memory 102 is in the threshold range. If the data is in the threshold range, monitor 107 calculates an index value indicative of stability of the data outputted from measurer 101 based on the data in the threshold range. Then, monitor 107 determines whether or not the index value satisfies a stability condition. This processing is repeated each time data is stored in temporary memory 102 a certain number of times, or at certain time intervals.

If the index value satisfies the stability condition, monitor 107 outputs an abnormal value termination trigger to memory controller 106.

In step S11, the timer of function controller 105 outputs a measurement instruction to memory controller 106 for each preset measurement time. Upon accepting the measurement instruction, memory controller 106 executes step S12.

In step S12, memory controller 106 outputs a measurement request to measurer 101. Upon accepting this measurement request, the converter of measurer 101 accepts data which is an analog signal outputted from the sensor of measurer 101. The converter converts the analog signal to a digital signal, and outputs data of the digital signal to memory controller 106. Upon accepting the data, memory controller 106 executes step S13.

In step S13, memory controller 106 stores the accepted data in temporary memory 102 and saves the data in main memory 104. At this time, if the capacity of temporary memory 102 is insufficient, memory controller 106 erases the oldest data in temporary memory 102, and stores the accepted data in temporary memory 102.

In step S14, memory controller 106 accepts the abnormal value termination trigger outputted from monitor 107 in step S10. Upon accepting the abnormal value termination trigger, memory controller 106 executes step S15.

In step S15, memory controller 106 changes the held state information from the data recording state information to data monitoring state information, as well as outputs an abnormal value occurrence monitoring signal to monitor 107. Upon accepting the abnormal value occurrence monitoring signal, monitor 107 executes step S3.

Then, in step S16, when function controller 105 accepts a measurement stop request for terminating measurement from the operation portion, function controller 105 outputs a measurement stop trigger to memory controller 106. Upon accepting the measurement stop trigger, memory controller 106 executes step S17.

In step S17, memory controller 106 changes held state information to non-measurement state information, as well as outputs a monitoring stop signal intended to stop monitoring to monitor 107. Upon accepting the monitoring stop signal, monitor 107 terminates the operation.

By the measurement performed in the above described steps, data required for analysis of cause is stored in the main memory means.

Next, data to be stored in main memory 104 will be described.

Figure 6:
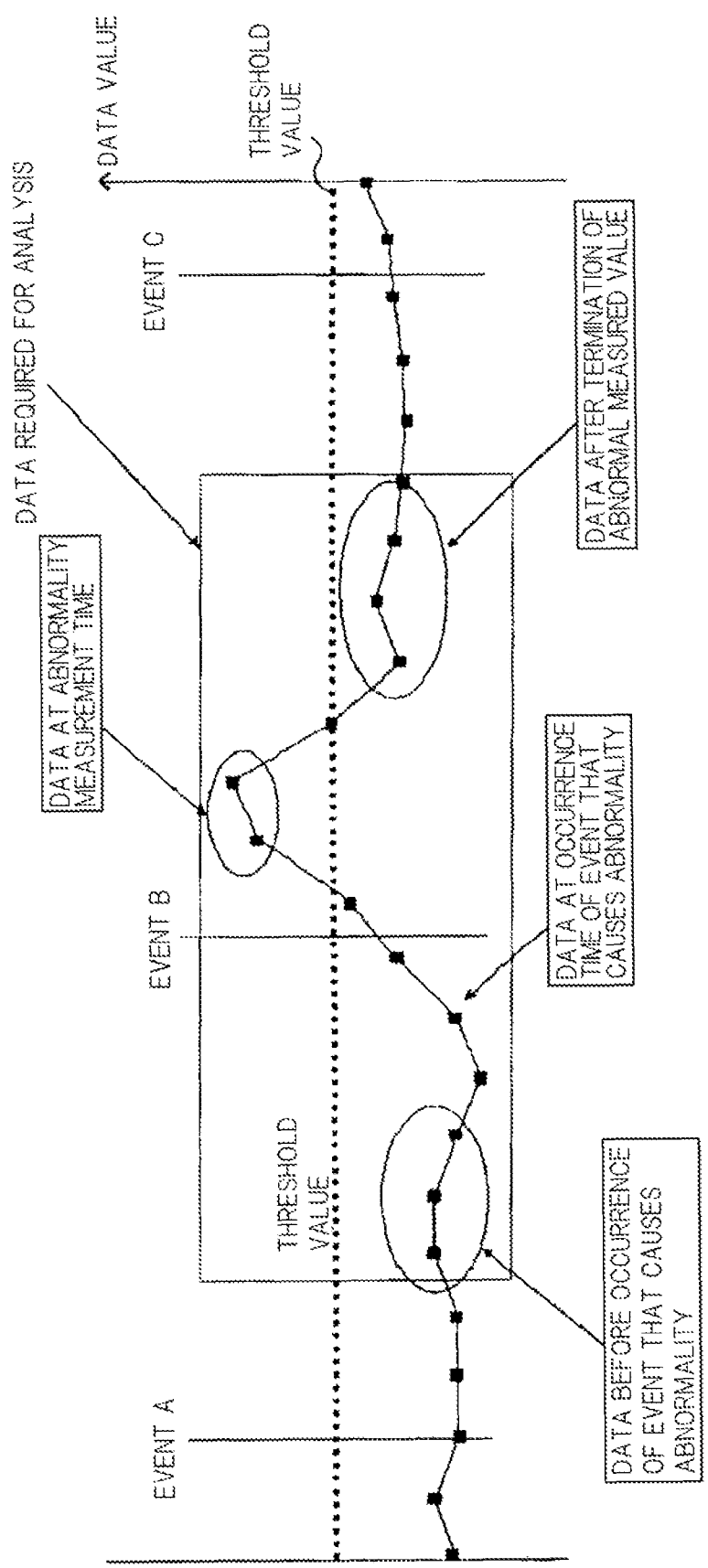
FIG. 6 is a time chart for illustrating data to be stored.

FIG. 6 is a time chart for illustrating data to be stored in main memory 104. In FIG. 6, a threshold range is a range greater than a threshold.

First, when memory controller 106 accepts an abnormal value trigger in step S7, memory controller 106 copies data stored in temporary memory 102 to main memory 104 in step S8. Thereby, the following data are saved: the time at which data exceeds the threshold range, that is, data at a time at which abnormality is detected (data at abnormality measurement time); data at a time at which an event occurs which is the cause of the occurrence of abnormality (data that occurs at the time of an event that causes abnormality); and data before a time at which the event occurs (data that occurs before the time of an event that causes abnormality).

Then, processing of steps S11 to S13 is performed for each measurement time set in the timer of function controller 105, wherein memory controller 106 saves data measured by measurer 101 in main memory 104.

After that, even if the data is within the threshold range, main memory 104 stores the data until monitor 107 determines that the index value satisfies a stability condition in step S10.

If monitor 107 determines that the index value satisfies the stability condition in step S10, memory controller 106 changes state information from data recording state information to data monitoring state information, and stops saving the data in main memory 104 in step S15. Therefore, main memory 104 saves not only data outside the threshold range (data at an abnormality measurement time) but also data until it is stabilized in the threshold range (data after termination of abnormal measured value).

Next, advantages will be described.

According to the present exemplary embodiment, if manager 103 accepts a save instruction, manager 103 copies data stored in temporary memory 102 to main memory 104.

In this case, data before a time at which an abnormality occurs can be saved. Therefore, even if data before occurrence of abnormality is required for analyzing a cause of occurrence of the abnormality, data required for analyzing a cause of occurrence of the abnormality can be acquired.

In the present exemplary embodiment, processing performed by each of function controller 105, memory controller 106, and monitor 107 is controlled by various types of triggers which are inputted and outputted between these components. Thereby, function controller 105, memory controller 106, and monitor 107 can operate asynchronously.

Next, a third exemplary embodiment will be described.

Although a data logger of the present exemplary embodiment includes the same configuration as shown in FIG. 3, a method for outputting an abnormal value trigger is different compared to that of the second exemplary embodiment.

In the second exemplary embodiment, when data newly stored in temporary memory 102 is outside a threshold range, monitor 107 outputs an abnormal value trigger to memory controller 106. In the present exemplary embodiment, when function controller 105 detects a predetermined operation from outside, function controller 105 outputs an abnormal value trigger to memory controller 106.

When transport quality control traceability which traces a transport status such as a transport path is used, a data logger (especially a data logger of an RFID tag) may be used by reading out the data of the data logger at points on the transport path for the purpose of inspecting of an attached product of the data logger, aside from a function for saving specific data. For example, in a case where a data logger is an RFID tag, a product attached to the data logger is inspected by a reader/writer reading out an identifier that identifies its RFID.

Timing to read out such data is often timing at which a transport accident is likely to happen such as transfer of an attached product between traders or change of a surrounding environment of an attached product. Therefore, to store data measured before and after this timing is useful in quality control in transportation of attached products.

Therefore, if a predetermined operation detected by function controller 105 is an operation for reading out data in the data logger or the like, only data near the timing at which a transport accident is likely to happen can be stored.

In the present exemplary embodiment, monitor 107 does not perform abnormal value occurrence monitoring processing, but only performs abnormal value termination monitoring processing.

Figure 7:
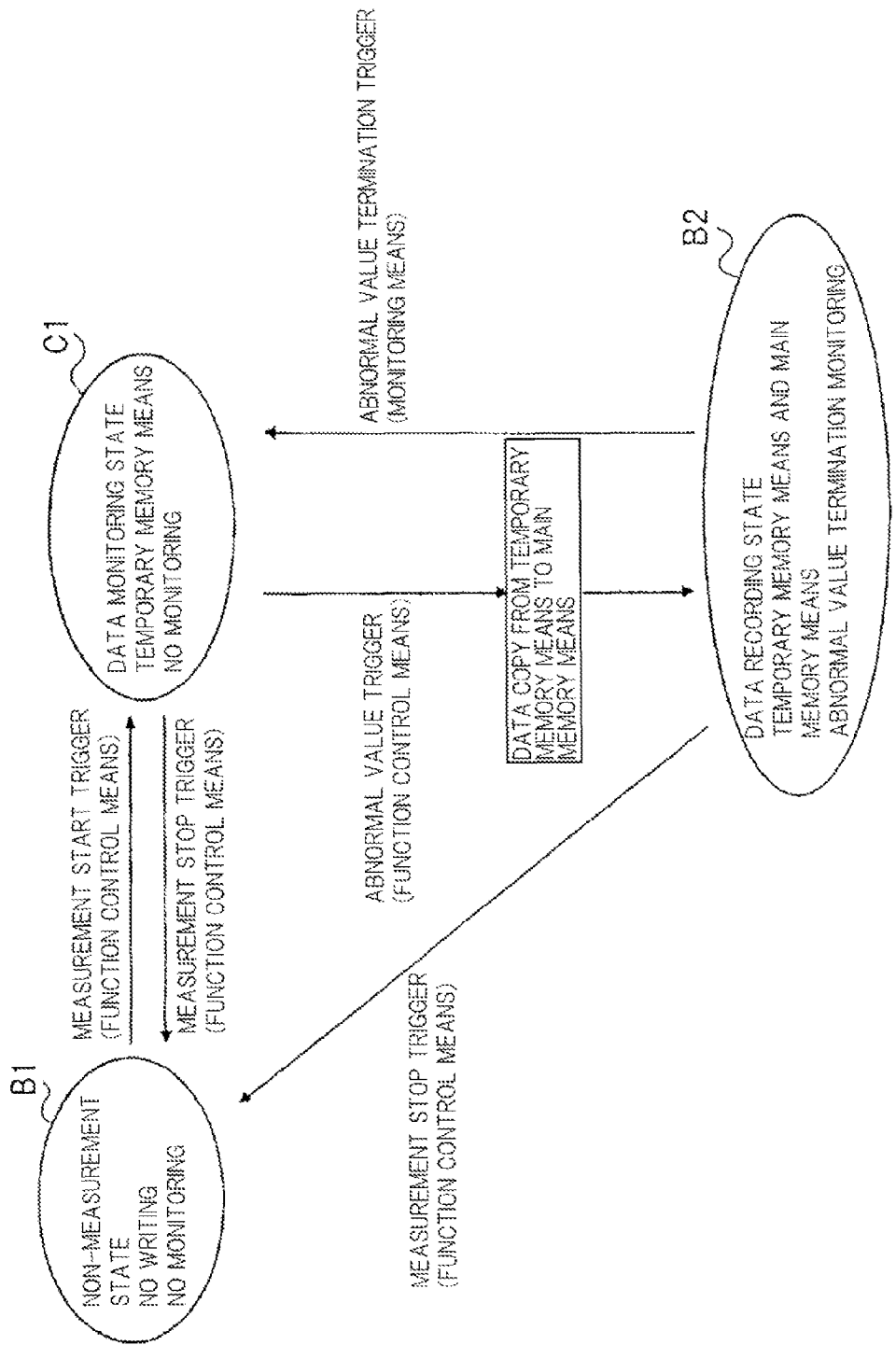
FIG. 7 is an explanatory diagram for illustrating state transition of a data logger of a third exemplary embodiment.

Next, an overview of state transition of the data logger will be described. FIG. 7 is an explanatory diagram for illustrating state transition of the data logger. Hereinafter, states different from those in FIG. 4 will be mainly described.

In non-measurement state B1, when accepting a measurement start trigger from function controller 105, memory controller 106 changes non-measurement state information to the data monitoring state information, thereby changing the state of the data logger to data monitoring state C1.

In data monitoring state C1, temporary memory 102 sequentially stores data outputted from measurer 101, and monitor 107 does not monitor data.

Further, in data monitoring state C1, when function controller 105 detects a predetermined operation, function controller 105 outputs an abnormal value trigger to memory controller 106. When accepting an abnormal value trigger from function controller 105, memory controller 106 changes the data monitoring state information to the data recording state information, thereby changing the state of the data logger to data recording state B3.

Next, operation will be described.

Figure 8:
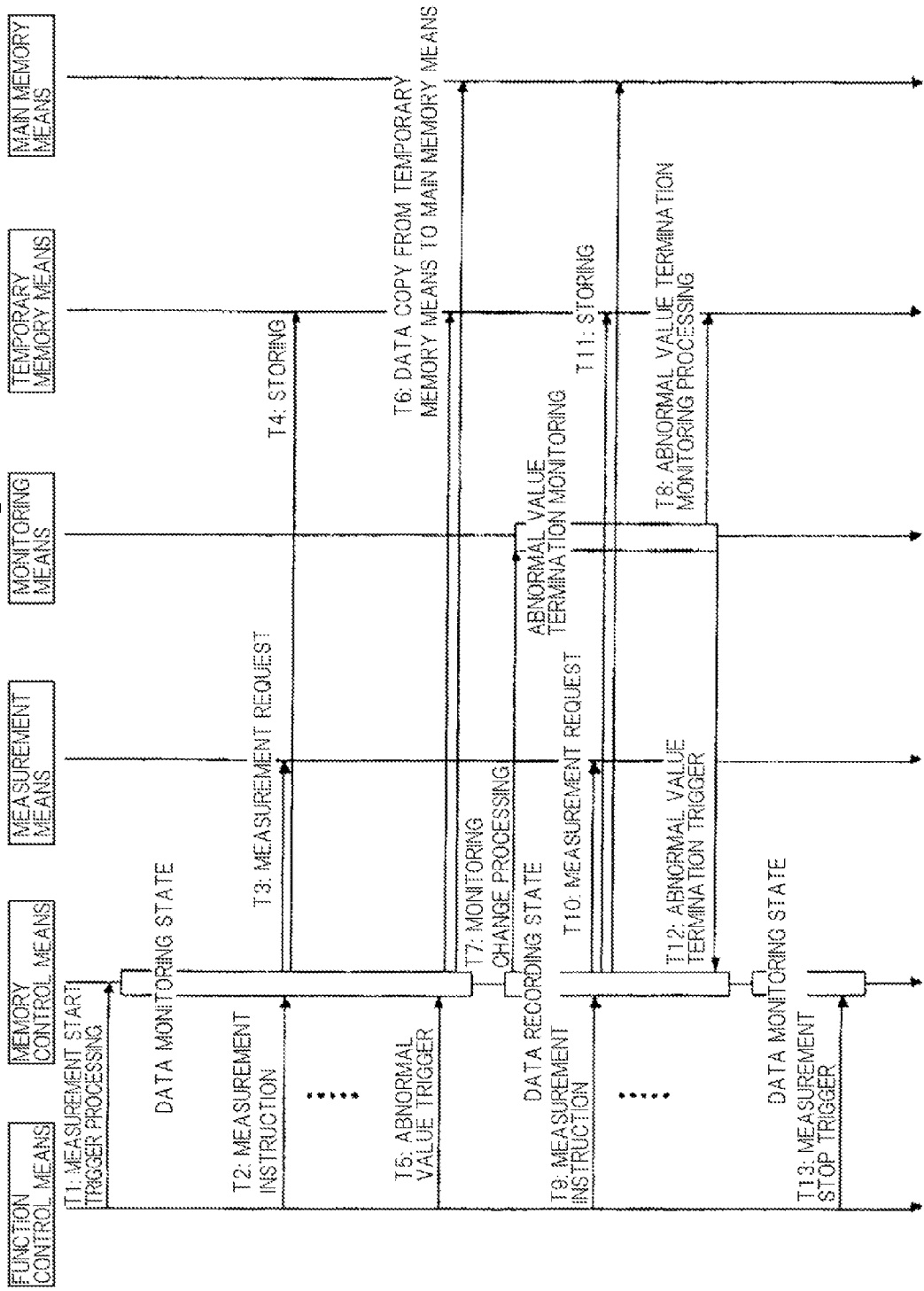
FIG. 8 is a flowchart for illustrating an operation of the data logger of the third exemplary embodiment.

FIG. 8 is a sequence diagram for illustrating the operation of the data logger of the present exemplary embodiment. Hereinafter, processing different from the processing illustrated in FIG. 5 will be mainly described. It is assumed that the initial state of the data logger is non-measurement state B1.

In step T1, when function controller 105 accepts a measurement start request from the operating portion, function controller 105 outputs a measurement start trigger to memory controller 106. Upon accepting the measurement start trigger, memory controller 106 changes the held state information from the non-measurement state information to the data monitoring state information Since each processing of steps T2 to T4 is the same processing as the respective processing of steps S4 to S6, description thereof will be omitted.

In step T5, when function controller 105 detects a predetermined operation from a reader/writer or the like, function controller 105 outputs an abnormal value trigger to memory controller 106. After that, step T6 is executed.

In step T6, upon accepting the abnormal value trigger outputted in step T5, memory controller 106 copies data stored in temporary memory 102 to main memory 104. Thereby, data a little before the timing at which a transport accident is likely to happen is saved.

After completing step T6, memory controller 106 executes step T7.

Since each processing of steps T7 to T11 is the same processing as the respective processing of steps S9 to S13, description thereof will be omitted.

In step T12, when memory controller 106 accepts an abnormal value termination trigger outputted from monitor 107 in step T8, memory controller 106 changes the held state information from the data recording state information to data monitoring state information, as well as outputs a monitoring stop signal to monitor 107. Upon accepting the monitoring stop signal, monitor 107 terminates its operation. After that, step T13 is executed.

In step T13, when function controller 105 accepts a measurement stop request from the operation portion, function controller 105 outputs a measurement stop trigger to memory controller 106. Upon accepting the measurement stop trigger, memory controller 106 changes the held state information to the non-measurement state information, and terminates the operation.

Next, an advantage will be described.

In the present exemplary embodiment, when function controller 105 detects a predetermined operation from outside, function controller 105 outputs an abnormal value trigger to memory controller 106.

In this case, if a predetermined operation is set as appropriate, data from the timing at which a transport accident is likely to happen until when its value is stabilized can be saved, and therefore, for example, it is possible to figure out whether or not an attached product has been successfully transferred between traders.

Next, a fourth exemplary embodiment will be described.

A data logger of the present exemplary embodiment includes the same configuration as shown in FIG. 3, but a method for outputting an abnormal value trigger is different compared to that of the second exemplary embodiment.

In the second exemplary embodiment, when data newly stored in temporary memory 102 exceeds a threshold range, monitor 107 outputs an abnormal value trigger to memory controller 106. In the third exemplary embodiment, when function controller 105 detects a predetermined operation from outside, function controller 105 outputs an abnormal value trigger to memory controller 106.

The present exemplary embodiment includes both of the above described output methods. Thus, monitor 107 outputs an abnormal value trigger to memory controller 106 when data newly stored in temporary memory 102 exceeds a threshold range. Further, function controller 105 outputs an abnormal value trigger to memory controller 106 when it detects a predetermined operation from outside.

Next, operation will be described.

Figure 9:
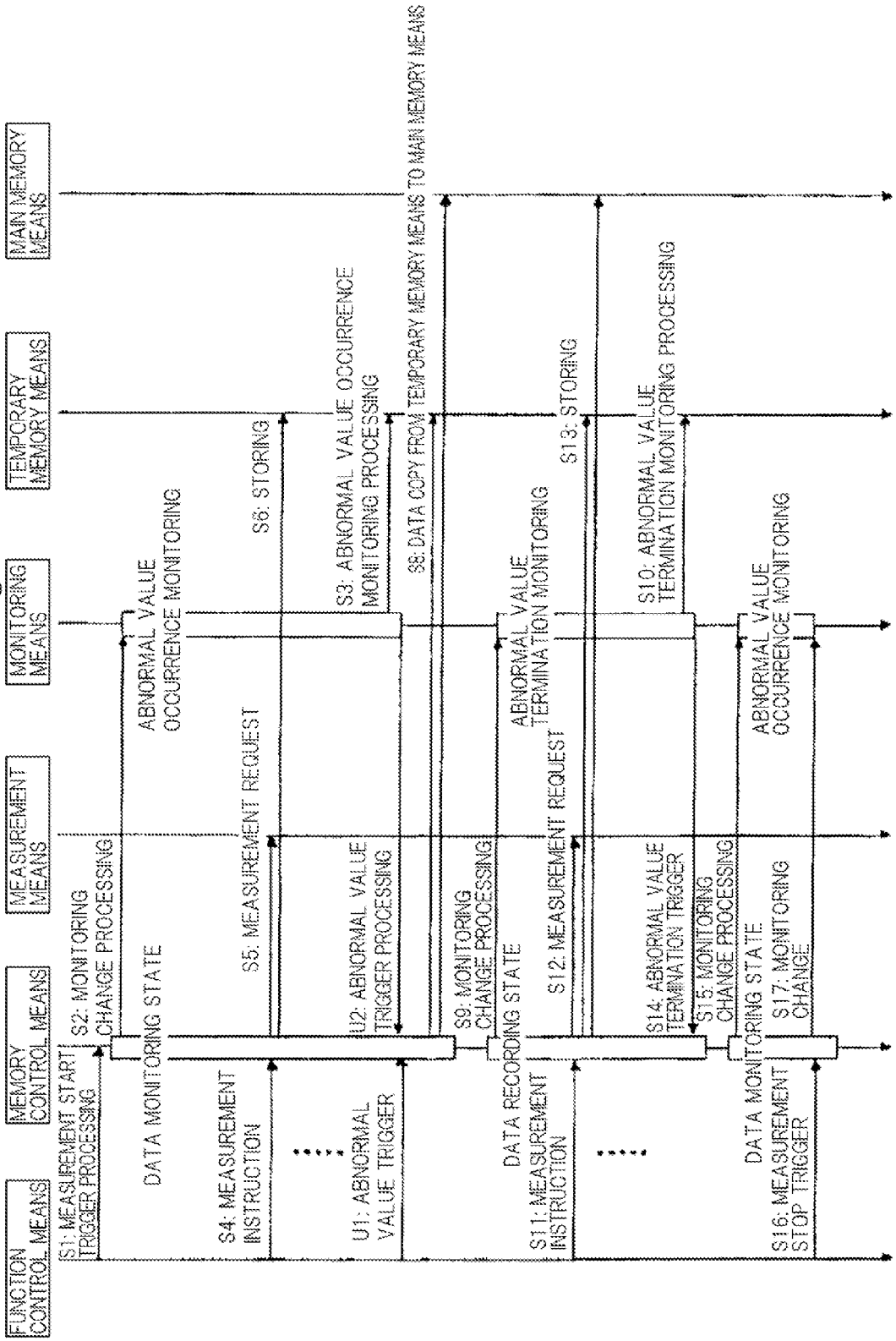
FIG. 9 is a flowchart for illustrating an operation of a data logger of a fourth exemplary embodiment.

FIG. 9 is a flowchart for illustrating the operation of the data logger of the present exemplary embodiment. In FIG. 9, the same processing as in FIG. 5 is given the same symbol. In FIG. 9, step U1 is included in addition to the processing described in FIG. 5, and step U2 is executed instead of step S7.

In step U1, when function controller 105 detects a predetermined operation from a reader/writer or the like, function controller 105 outputs an abnormal value trigger to memory controller 106.

In step U2, memory controller 106 accepts an abnormal value trigger outputted from monitor 107 in step S3 or an abnormal value trigger outputted from function controller 105 in step U1. Upon accepting the abnormal value trigger, memory controller 106 executes step S8.

Next, an advantage will be described.

When function controller 105 detects a predetermined operation from outside, function controller 105 outputs an abnormal value trigger to memory controller 106. Further, when data newly stored in temporary memory 102 is exceed a threshold range, monitor 107 outputs an abnormal value trigger to memory controller 106.

In this case, it is possible to save data from the timing at which a transport accident is likely to happen until when its value is stabilized, and data from when a value becomes an abnormal value until when it is stabilized.

Next, a fifth exemplary embodiment will be described.

Figure 10:
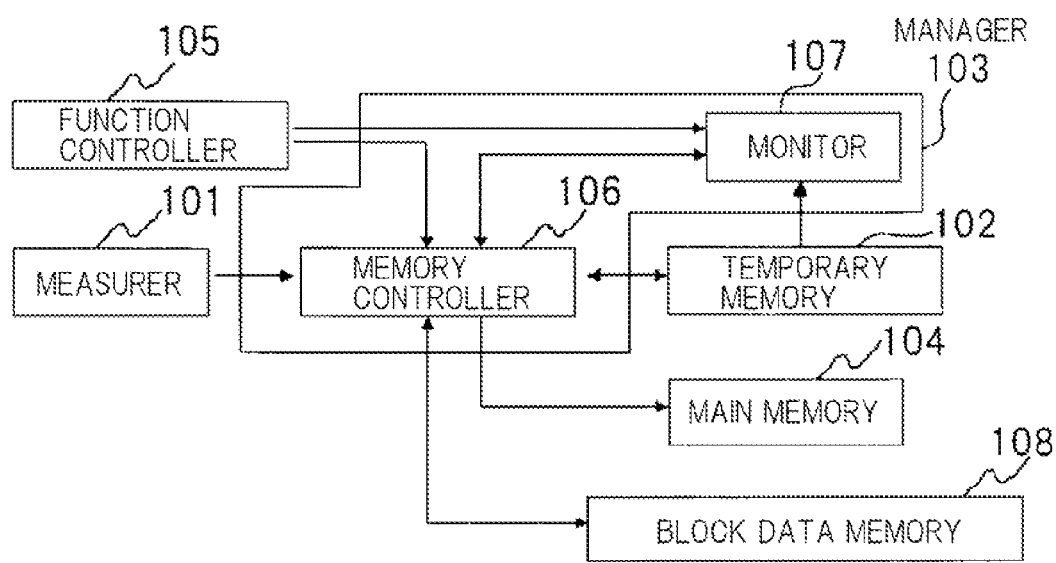
FIG. 10 is a block diagram showing a configuration of a data logger of a fifth exemplary embodiment.

FIG. 10 is a block diagram showing a configuration of a data logger of the present exemplary embodiment. In FIG. 10, the same elements as in FIG. 3 are given the same symbols.

In FIG. 10, the data logger further includes block data memory 108 in addition to the components shown in FIG. 3. In the present exemplary embodiment, block data memory 108 is one example of the second storage means, and main memory 104 is one example of the third storage means.

In the present exemplary embodiment, instead of main memory 104, block data memory 108 sequentially saves data outputted from measurer 101 when memory controller 106 accepts an abnormal value trigger. Then, when monitor 107 determines that an index value satisfies a stability condition, block data memory 108 stops saving the data outputted from measurer 101.

In addition, when memory controller 106 accepts the abnormal value trigger, memory controller 106 copies data stored in temporary memory 102 to block data memory 108.

In addition, when monitor 107 determines that an index value satisfies the stability condition, that is, an abnormal value termination trigger is accepted, memory controller 106 compresses the data stored in block data memory 108 and saves it in main memory 104.

Further, when accepting a measurement stop trigger from function controller 105, memory controller 106 compresses the data stored in block data memory 108 and saves it in main memory 104. A measurement stop trigger as used herein is one example of end instruction to terminate data measurement.

Figure 11:
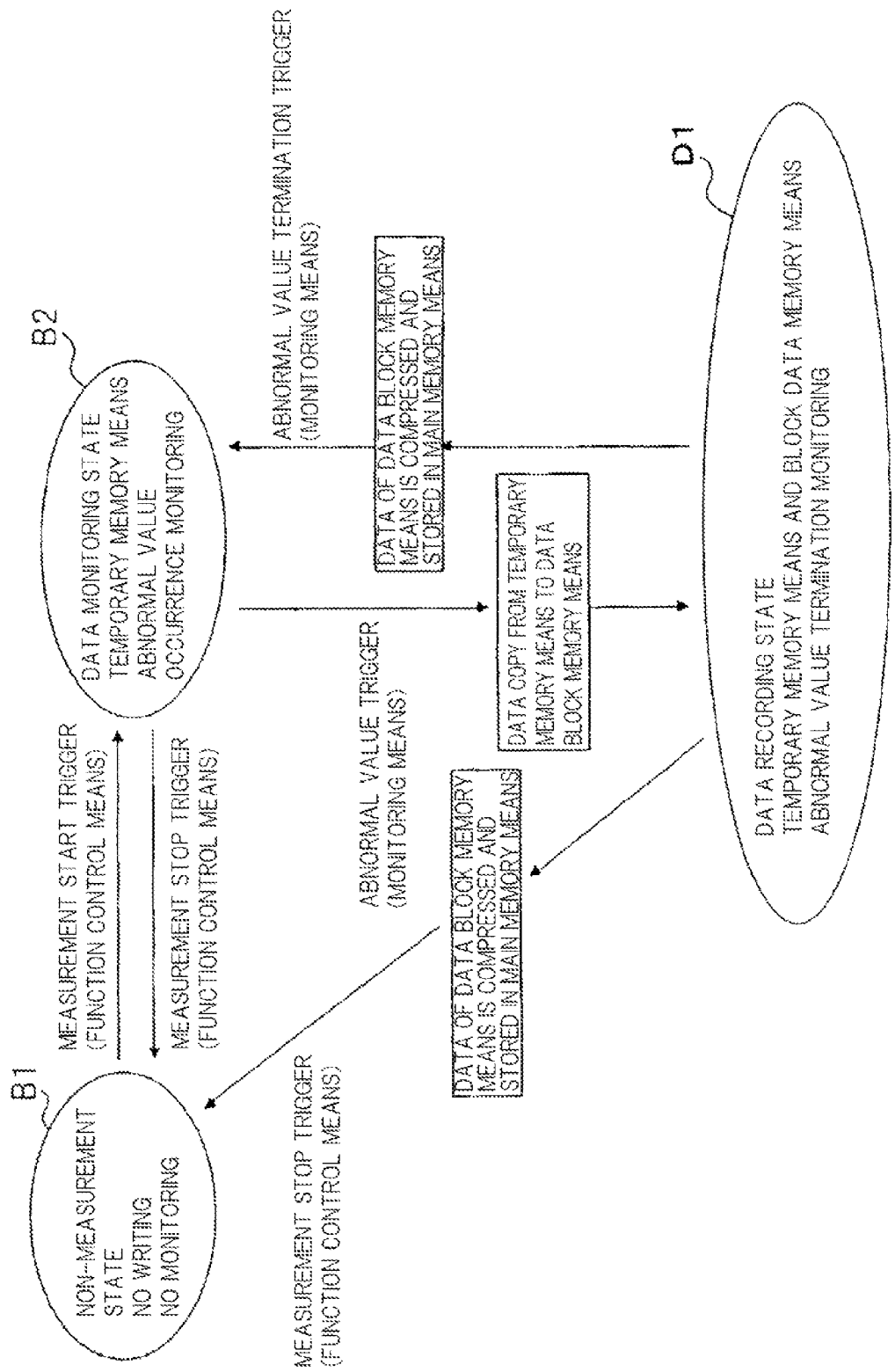
FIG. 11 is an explanatory diagram for illustrating state transition of the data logger of the fifth exemplary embodiment.

Next, an overview of the transition of the state of the data logger will be described. FIG. 11 is an explanatory diagram for illustrating of the transition of the state of the data logger. Hereinafter, states different from those in FIG. 4 will be mainly described.

In data monitoring state B2, when accepting an abnormal value trigger from monitor 107, memory controller 106 changes the data monitoring state information to the data recording state information, thereby changing the state of the data logger to data recording state D1. At this time, memory controller 106 copies data stored in temporary memory 102 to block data memory 108.

In data recording state D1, temporary memory 102 sequentially stores data, and block data memory 108 sequentially stores data. Further, monitor 107 performs abnormal value termination monitoring processing.

In data recording state D1, when accepting an abnormal value termination trigger from monitor 107, memory controller 106 changes the data recording state information to the data monitoring state information, thereby changing the state of the data logger to data monitoring state B2. At this time, memory controller 106 compresses the data stored in block data memory 108 and stores it in main memory 104.

In data recording state D1, when accepting a measurement end trigger from function controller 105, memory controller 106 changes the state information to the non-measurement state information, thereby changing the state of the data logger to non-measurement state B1. At this time, memory controller 106 compresses the data stored in block data memory 108 and stores it in main memory 104.

Next, operation will be described.

FIG. 12 is a sequence diagram for illustrating the operation of the data logger of the present exemplary embodiment. In FIG. 12, the same processing as in FIG. 5 is given the same symbol and description thereof will be omitted.

When memory controller 106 accepts an abnormal value trigger in step S7, memory controller 106 executes step V1.

In step V1, memory controller 106 copies data stored in temporary memory 102 to block data memory 108. After completing step V1, memory controller 106 executes S9.

Further, when memory controller 106 accepts the data in step S12, memory controller 106 executes step V2.

In step V2, memory controller 106 stores the accepted data in temporary memory 102 and saves the accepted data in block data memory 108.

Further, when memory controller 106 accepts an abnormal value termination trigger in step S14, memory controller 106 executes step V3.

In step V3, memory controller 106 acquires and compresses the data stored in block data memory 108. Memory controller 106 stores the compressed data in main memory 104. After completing step V3, memory controller 106 executes step S15.

Next, advantages will be described.

According to the present exemplary embodiment, when memory controller 106 accepts an abnormal value trigger, main memory 104 sequentially saves data outputted from measurer 101, and then, when an index value satisfying a stability condition is calculated by monitor 107, block data memory 108 stops saving the data outputted from measurer 101. In addition, when monitor 107 determines that the index value satisfies the stability condition, memory controller 106 compresses the data stored in block data memory 108 and saves it in main memory 104.

In this case, data saved in block data memory 108 is compressed and saved. Therefore, more amount of data can be saved. In addition, since compression and saving are performed in units of data for analysis of the cause of the occurrence of abnormality, data can be handled more easily compared to a case where all data are compressed at one time.

Next, a sixth exemplary embodiment will be described.

Although a data logger of the present exemplary embodiment includes the same configuration as shown in FIG. 3, a method for outputting an abnormal value trigger is different compared to that of the second exemplary embodiment.

In the second exemplary embodiment, when data newly stored in temporary memory 102 exceeds a threshold range, monitor 107 outputs an abnormal value trigger. However, even in a case where data is within a threshold range, if the data has varied widely, there is a possibility that an abnormality has occurred, and saving the data is useful.

Therefore, in the present exemplary embodiment, if width variation in the data stored in temporary memory 102 is wide, monitor 107 outputs an abnormal value trigger.

Specifically, monitor 107 repeatedly calculates an evaluation value indicative of a degree of variation of data outputted from measurer 101 based on the data stored in temporary memory 102 until the evaluation value satisfies a predetermined abnormal condition. When the evaluation value satisfies the abnormal condition, monitor 107 outputs an abnormal value trigger to memory controller 106.

For example, first, monitor 107 identifies variation target data which is a target of determination, from the data stored in temporary memory 102.

The variation target data may be all or some of the data stored in temporary memory 102. If the variation target data is some of the data stored in temporary memory 102, monitor 107 identifies, for example, newer data the number of which corresponds to a predetermined number smaller than a specific number, as the variation target data. The number of the variation target data may be one or more. A plurality of variation target data are assumed in the following description.

Then, monitor 107 obtains slopes of the plurality of variation target data $B_{1,2}$ to $B_{n-1,n}$, and obtains a maximum slope $B_{x,y}$ among the slopes $B_{1,2}$ to $B_{n-1,n}$, as evaluation value J. Alternatively, monitor 107 may obtain an average value $B_{Bve}$ of the slopes $B_{1,2}$ to $B_{n-1,n}$, as evaluation value J.

Then, monitor 107 determines whether or not evaluation value J is greater than predetermined variation reference value Th2. If evaluation value J is greater than variation reference value Th2, monitor 107 determines that evaluation value J satisfies an abnormal condition.

Alternatively, monitor 107 may obtain variance V of the plurality of variation target data as evaluation value J, and determines whether or not evaluation value J is greater than variation reference value Th2. In this case, if evaluation value J is greater than variation reference value Th2, monitor 107 determines that evaluation value J satisfies an abnormal condition.

Monitor 107 may perform a plurality of these determinations. In this case, monitor 107 may determine that evaluation value J satisfies the abnormal condition if it determines that evaluation value J is greater than variation reference value Th2 in one of the plurality of determinations, or may determine that evaluation value J satisfies the abnormal condition if it determines that evaluation value J is greater than variation reference value Th2 in every one of the plurality of determinations.

The variation reference value is defined by a user or the like. In a case where monitor 107 performs a plurality of determinations, a plurality of variation reference values corresponding respectively to the plurality of determinations are defined.

Next, operation will be described.

FIG. 13 is a flowchart for illustrating the operation of the data logger. In FIG. 13, the same processing as in FIG. 5 is given the same symbol. In FIG. 13, step W1 is executed instead of step S3 as regards the processing described in FIG. 5.

In step S2, when monitor 107 accepts an abnormal value occurrence monitoring signal, monitor 107 executes step W1.

In step W1, monitor 107 accesses data in temporary memory 102, and calculates an evaluation value based on the data. Monitor 107 determines whether or not the evaluation value satisfies a predetermined abnormal condition. This processing is repeated each time data is stored in temporary memory 102 a certain number of times, or at certain time intervals.

If monitor 107 determines that the evaluation value satisfies the abnormal condition, monitor 107 outputs an abnormal value trigger to memory controller 106. After that, step S7 is executed.

Next, an advantage will be described. Monitor 107 repeatedly calculates an evaluation value indicative of a degree of variation of data outputted from measurer 101 based on data stored in temporary memory 102 until the evaluation value satisfies a predetermined abnormal condition. When the evaluation value satisfies the abnormal condition, monitor 107 outputs an abnormal value trigger to memory controller 106.

In this case, if the evaluation value indicative of a degree of variation of data satisfies the abnormal condition, the abnormal trigger is outputted. Therefore, if an abnormal condition is set as appropriate, the occurrence of abnormality can be detected more accurately.

The above described function of the data logger may be executed by a program for implementing the function being recorded on a computer-readable recording medium and loaded into a computer. The computer-readable recording medium includes a recording medium such as a flexible disk, a magneto-optical disk or a CD-ROM, and a recording device such as a hard disk device incorporated in a computer system. Further, the computer-readable recording medium includes those which retain a program for a short time dynamically (a transition medium or a carrier wave) such as in a case where a program is transmitted via the Internet, and those which retain a program for a certain period such as a volatile memory in a computer which is a server in the above case.

Although the present invention has been described above with reference to the exemplary embodiments, the present invention is not limited to the above described exemplary embodiments. The configurations and details of the present invention may be modified in various ways understood by those skilled in the art within the scope of the present invention.

The invention claimed is:

1. A data logger comprising:
   a first storage storing newer data among data sequentially outputted from a measurer such that number of stored data become a specific number;
   second storage; and
   a manager that, if a save instruction to save the data outputted from said measurer is accepted, repeatedly calculates an index value indicative of stability of the data outputted from said measurer based on the data stored in said first storage at least until the index value satisfies a predetermined stability condition, and sequentially saving the data outputted from said measurer in said second storage, and when the index value satisfying said predetermined stability condition is calculated, stops saving the data from said measurer in said second storage.

2. The data logger according to claim 1, wherein said manager copies the data stored in said first storage to said second storage if the save instruction is accepted.

3. The data logger according to claim 1, wherein said manager comprises:
   a monitor that repeatedly calculates an evaluation value indicative of a degree of variation of the data outputted from said measurer based on the data stored in said first storage until the evaluation value satisfies a predetermined abnormal condition, and outputs the save instruction when the evaluation value satisfies said predetermined abnormal condition; and
   a memory controller that accepts the save instruction from said monitor.

4. The data logger according to claim 1, further comprising third storage,
- wherein when said manager stops saving the data in said second storage, said manager compresses the data stored in said second storage and saves the data stored in said second storage in said third storage.

5. The data logger according to claim 1, comprising a function controller that outputs the save instruction to said manager if a predetermined operation from outside is detected.

6. A data saving method performed by a data logger which includes first storage that store newer data among data sequentially outputted from measurer wherein number of the newer data corresponds to a specific number of times, and second storage, the method comprising:
- if a save instruction to save the data outputted from said measurer is accepted, repeatedly calculating an index value indicative of stability of the data outputted from said measurer based on the data stored in said first storage at least until the index value satisfies a predetermined stability condition;
- sequentially saving the data outputted from said measurer in said second storage if the save instruction is accepted; and
- stopping saving the data from said measurer in said second storage when the index value satisfying said predetermined stability condition is calculated.

7. The data saving method according to claim 6, comprising copying the data stored in said first storage to said second storage if the save instruction is accepted.

8. The data saving method according to claim 6, comprising:
- repeatedly calculating an evaluation value indicative of a degree of variation of the data outputted from said measurer based on the data stored in said first storage until the evaluation value satisfies a predetermined abnormal condition; and
- outputting the save instruction when the evaluation value satisfies said predetermined abnormal condition.

9. The data saving method according to claim 6,
- wherein the data logger comprises third storage, and
- wherein the method comprises compressing the data stored in said second storage and saving the data stored in said second storage in said third storage when saving the data in said second storage is stopped.

10. The data saving method according to claim 6, comprising outputting the save instruction if a predetermined operation from outside is detected.

11. A non-transitory recording medium readable by a computer and storing therein a program causing a computer to execute data saving processing, the computer being connected to first storage for storing newer data among data sequentially outputted from measurer wherein number of the newer data corresponds to a specific number of times, and second storage, the data saving processing comprising:
- calculating processing for, if a save instruction to save the data outputted from said measurer is accepted, repeatedly calculating an index value indicative of stability of the data outputted from said measurer based on the data stored in said first storage at least until the index value satisfies a predetermined stability condition;
- saving processing for sequentially saving the data outputted from said measurer in said second storage if the save instruction is accepted; and
- stop processing for stopping saving the data from said measurer in said second storage when the index value satisfying the stability condition is calculated.

12. The non-transitory recording medium according to claim 11, wherein said program causes the computer to execute copy processing for copying the data stored in said first storage to said second storage if the save instruction is accepted.

* * * * *